United States Patent [19]
Jones et al.

[11] Patent Number: 5,778,067
[45] Date of Patent: Jul. 7, 1998

[54] VALUE TRANSFER SYSTEM

[75] Inventors: Timothy Lloyd Jones, East Sussex; Graham Robert L. Higgins, Avon, both of England

[73] Assignee: Mondex International Limited, London, United Kingdom

[21] Appl. No.: 664,907

[22] Filed: Jun. 17, 1996

Related U.S. Application Data

[63] Continuation of Ser. No. 400,003, Mar. 6, 1995, Pat. No. 5,623,547, which is a continuation of Ser. No. 804,654, Dec. 11, 1991, filed as PCT/GB90/00566, Apr. 4, 1991, abandoned.

[30] Foreign Application Priority Data

Apr. 12, 1990 [GB] United Kingdom ............ 9008362

[51] Int. Cl.$^6$ .................. H04L 9/00; H04L 9/32; H04L 9/30; H04L 9/06
[52] U.S. Cl. .................. 380/24; 380/4; 380/9; 380/23; 380/29; 380/30; 380/49; 235/379; 235/380; 705/39; 705/41
[58] Field of Search .................. 380/4, 9, 21, 23, 380/24, 25, 49, 50, 29, 30; 235/379, 380; 705/35, 39, 40, 41, 42, 43, 44

[56] References Cited

U.S. PATENT DOCUMENTS

| | | |
|---|---|---|
| 4,839,504 | 6/1989 | Nakano . |
| 4,877,950 | 10/1989 | Halpern .................. 235/380 X |
| 4,906,828 | 3/1990 | Halpern .................. 235/379 |
| 4,935,962 | 6/1990 | Austin .................. 380/25 |
| 4,992,646 | 2/1991 | Collin .................. 235/379 X |
| 5,012,076 | 4/1991 | Yoshida . |
| 5,030,806 | 7/1991 | Collin .................. 235/380 X |

FOREIGN PATENT DOCUMENTS

| | | |
|---|---|---|
| 0 256 768 | 2/1988 | European Pat. Off. . |
| 58-57784 | 12/1983 | Japan . |
| 60-196874 | 10/1985 | Japan . |
| 60-198683 | 10/1985 | Japan . |
| 61-75996 | 4/1986 | Japan . |
| 62-67673 | 3/1987 | Japan . |
| 63-32658 | 2/1988 | Japan . |
| 63-39099 | 2/1988 | Japan . |
| 63-176043 | 7/1988 | Japan . |
| 2-1049 | 1/1990 | Japan . |
| 3-92966 | 4/1991 | Japan . |
| 7-104891 | 11/1995 | Japan . |
| 1504196 | 3/1978 | United Kingdom . |
| 1505715 | 3/1978 | United Kingdom . |

OTHER PUBLICATIONS

"Siemens Short Form Catalog: Integrated Circuit Division 1995/1996"; http://www.allianet.com/siemens/catalog/08.html.

"The Smart Card Cyber Show," Analyses Et Synthesis; Paris, France; No Date; http://www.cardshow.com/industry/CP8Transac.

"Gemplus: A Brief History," Gemplus SA; Gémenos, France;http://www.gemphus.com/company–overview.html. No Date.

Financial Information Systems, Report from the Financial Committee of the IC Card Study Group, "Usage and Standardisation of IC Cards in Finance", Financial Information Systems Centre (FISC) Foundation, No. 18, 1986.

*Primary Examiner*—Bernarr E. Gregory
*Attorney, Agent, or Firm*—Nixon & Vanderhye P.C.

[57] ABSTRACT

A value transfer system which allows value to be transferred between electronic purses comprises computer which controls the loading of purses with value and the redemption of value from purses, a special bulk purse or purses and a value meter securely linked thereto which registers the total net value issued to the bulk purse or purses. Draw-down of value and redemption of value transactions are effected with the bulk purses.

8 Claims, 6 Drawing Sheets

VALUE TRANSFER SYSTEM

This is a CONTINUATION of application Ser. No. 08/400,003, filed Mar. 6, 1995, Now U.S. Pat. No. 5,623,597, which in turn is a continuation of application Ser. No. 07/804,654 filed Dec. 11, 1991, filed as PCT/GB90/00566, Apr. 4, 1991 now abandoned.

BACKGROUND OF THE INVENTION

1. Field of the Invention

The invention relates to a value transfer system for cashless transactions.

2. Discussion of Prior Art

Several kinds of cashless financial transaction services are available. These include credit cards and debit cards which customers may use with a wide range of retailers. Each transaction is accompanied by the provision of customer account details required for the actual transfer of funds between the specific customers and the specific retailers.

Another form of cashless card system is the pre-payment card system, where a card is purchased prior to a series of transactions and a value record recorded on it is appropriately decremented on each transaction. A phone card is an example of a pre-payment card.

Such prior systems are inflexible and are no general substitute for cash in low value high volume transactions. Various proposals have been put forward to allow the interchange of money values between "electronic purses". For example, U.S. Pat. No. 4,839,504 (Casio Computer Co Ltd) discloses a system where a user is able to load money value on to an integrated circuit (IC) card, otherwise known as a smart card, by communication with his bank. At the bank the same value is applied to a separate IC account set up for the user. Purchases are able to be made by transfer of money values from the IC card to retailer equipment off-line from the bank. Each transaction requires transmission to the retailer and retention by him of details which include the purchaser's identity. Ultimately, in claiming funds from the bank the retailer presents a list of transaction details and there is account reconciliation to allow the IC account of the appropriate purchaser to be adjusted.

Procedures which, as above, require ultimate account reconciliation for every transaction are attended by two disadvantages. The first is practical. The storing, transmitting and reconciling of purchaser details for every transaction places an impossible burden on equipment if all cash type transactions are contemplated. Processing all such transactions efficiently in an acceptable time is not possible, even with the most modern equipment. The second objection is social. The anonymity of cash would be lost and potential would exist for details of personal spending habits to be derived.

The second of the above objections has been addressed by Chaum in "Controlling your Information with a Card Computer" ("Concepts Applications Activities" published by TeleTrust March 1989). Chaum proposes a system of "blind signatures" of money value items effected by an authorising entity such as a bank. This is a way of preventing ready identification of purchasers. However, a problem remains in that double payment by a purchaser must be detectable and Chaum meets this difficulty by including, in the data transferred in an off-line transaction, encrypted information concerning the purchaser. This information is relayed to the bank when the retailer claims credit and is used at the bank to detect double use of the same "electronic cash". Also, each signed item is recorded at the bank to make possible ultimate reconciliation of claims against these items, albeit without customer identification. The problems of storage, transmission and processing of individual transaction information remain. Additionally, Chaum introduces another difficulty. His system requires that each item of signed "electronic cash" should be treated as a unit and is incapable of division. Again this means that the system is inappropriate for small value high volume transactions.

SUMMARY OF THE INVENTION

The present invention seeks to provide a practical solution to the problem of providing a framework suitable for cashless small value high volume transactions.

According to the invention there is provided a value transfer system having a computer; a plurality of electronic purses; exchange devices whereby purses may communicate with each other to transfer value in transactions which are off-line from the computer i.e., not connected to the computer; draw-down means for loading purses with value under control of the computer; redemption means for redeeming value from purses under control of the computer; a value meter; one or more of said purses being bulk purses which are capable of having value loaded and redeemed via the value meter, the value meter recording one or more float value records whereby the net value released to the bulk purse or purses may be derived, the net value being the difference between the total of values drawn down to the bulk purse or purses and the total of values redeemed from the bulk purse or purses, the float value record being non-specific with regard to individual draw-downs and redemptions.

The value meter may have an interface whereby the float value record may be adjusted on command so as to create or destroy value within the bulk purse or purses.

Preferably there is provided, in each purse, storage means which stores a purse value record which is accumulative and, in each purse or associated exchange device, a microprocessor, transactions being conducted between purse pairs, one of which, the sending purse, sends value and the other of which, the receiving purse, receives value, the microprocessors being programmed so that in each off-line transaction the purse value record in the sending purse is decreased by a chosen and variable transaction value and the purse value record in the receiving purse is increased by the same transaction value.

By providing a float value record which is nonspecific anonymity is ensured and reconciliation with customer accounts for all subsequent purse to purse transactions is unnecessary.

The above combination of features allows transactions to be effected and entirely completed without subsequent recourse or reference to any third party, and in particular without reference to the computer. The advantages in terms of anonymity and computer processing time are clear. A retailer, for example, may make claims to redeem value from time to time, the nature and identity of all the off-line transactions which contribute to the retailer purse value record playing no part in the claim.

Preferably the purses have means whereby a transaction between a pair of purses is given a unique identifier and the microprocessors are programmed to respond to the identifiers to prevent a given transaction being repeated. No reference is then required to the computer to determine whether the same "electronic cash" is being used twice. In claiming to redeem value the computer is accessed and it will be possible to determine whether the same claim is being made twice, either directly or, since a claim may be simply another transaction, by means of a transaction identifier. The transaction identifier is preferably sent from the transmitting purse to the receiving purse, being conveniently derived from data identifying the receiving purse and a receiving purse transaction sequence number or electronic date/time stamp obtained from the receiving purse in a preliminary "hand-shaking" operation. In this way the receiving purse can monitor the transaction and any attempt to transmit the same value record twice will be foiled.

Security of the system demands that cryptographic techniques be employed to prevent fraud. The most effective cryptographic techniques are asymmetrical in that they require different keys to encrypt and decrypt information. One well-known and suitable cryptographic technique is that attributed to Rivest, Shamir and Adleman, known as the RSA system. It is envisaged that both purses of a communicating pair may employ the RSA system equally in a balanced way for algorithmic processing. However, whereas RSA encryption is straight-forward, relatively powerful computing facilities are required to execute RSA decryption conventionally in a short time. In order to overcome this difficulty, in the interests of economy and speed, it is proposed in accordance with a feature of the invention that an unbalanced system be used in which the processing capability required by consumer purses is significantly less than that required by retailer purses.

Each user of an asymmetrical key cryptographic system has a key pair, namely a public key and a secret key. Messages to another are encrypted using the other's (remote) public key which is made available, perhaps by a key exchange procedure. Received messages are decrypted using the local secret key. Use of a public key is far less demanding of computing power than use of a secret key so that conventionally encryption requires less computing overhead than decryption. Therefore, in implementing an unbalanced system of the kind described it is expedient to remove the requirement that the consumer purse performs conventional RSA decryption.

A first way of reducing the cryptographic burden in the consumer purse is to provide it with a simpler, symmetrical, cryptographic system. Such a system uses the same key for encryption and decryption. An example is the DES cryptographic· system (Data Encryption Standard—US PIPS 46,1976). Retailer purses retain the full power of the RSA system.

A second method is to use the consumer pursers own public key/secret key system for the interchange of data. In an exchange of keys the consumer purse sends its secret key to the retailer purse. In the transmission of data to the retailer purse the consumer purse would encrypt using its own public key and the retailer purse would decrypt using the consumer purse's secret key.

Security can be enhanced by using electronically certified data, for example digitally signed data, in the transaction process. Each purse on issue will be allocated a characteristic number and will have that number signed by the secret key of an asymmetrical global cryptographic system. The result will be a global signing of the number and this is stored in the purse. All parses will carry the public key of the global pair so that on receipt of another's globally signed number it will be possible to verify that it is valid. The numbers can be regarded as globally certified. Since transactions will require the exchange of encryption keys it is convenient, although not necessary, to arrange that the globally certified numbers are the encryption keys to be exchanged.

The electronic purses may take a number of physical forms. They will include computer processing facilities which may be incorporated in IC or "smart" cards, key fobs, wallets or the like or built into electronic equipment such as point-of-sale equipment or calculators, for example.

Communication with the computer will generally be established by telephone and purses may be incorporated in telephones or modems, since it is possible that desired transactions may be conducted entirely by telephone. However, a more generally convenient arrangement is to have a portable purse such as an IC card which is loaded via modem connection either by a device specific to the individual or by automatic teller machine, for example.

Purses may communicate with each other for the transfer of values by means of communication devices. These may have slots for two purses or may each hold a purse and communicate with each other by infra-red light or electromagnetic radiation, for example.

Reference was made above to the difficulty of providing fast asymmetrical cryptographic facilities in very small and inexpensive devices such as IC cards. Clearly, it is more readily possible to provide such facilities in a communication device or in a modem. Therefore, even though consumer purses may lack full computing power themselves, this may be provided by communication devices which have access to the consumer purse memories and public keys. Thus, while it is readily possible to exchange value records person to person if all purses have full asymmetrical cryptographic facilities this is also possible if the purses are simple and intelligent communication devices are used.

At least the retailers' equipment will generally have the capability to store transaction information. This may be in memory or on disk or on another card or by some other means. Indeed, the equipment may comprise a transfer device for transferring value from the consumer's IC card to a retailer's IC card. The storage capacity of the retailers' equipment need not be large since it is only an accumulated total which needs to be stored. However, it is envisaged that in addition to the transaction values, other information, for example about the identity of the consumer and/or retailer may be exchanged to allow a transaction print-out to be derived locally for analysis purposes. Codes for the goods may be included.

As well as the usual point-of-sale terminals either attended or unattended, the retailers' equipment may include automatic vending machines, travel ticket dispensers, car parking machines, road toll booths, etc. Although security to use a purse may be provided by the requirement to key a PIN code, this is not essential and a preferred arrangement dispenses with this requirement to facilitate use. However, it is envisaged that each purse may have a PIN protected memory and an unprotected memory, the system being such that by use of a terminal or pocket exchange device, value records may be transferred by use of the PIN code from the protected to the unprotected part of the purse.

As mentioned above,individuals may carry their own pocket exchange devices to allow interchanges of transaction values person to person. Refunds may be given or cheques "cashed" by retailers in an equivalent manner.

Value records may be loaded on to the purses in selected currencies for use in appropriate countries.

While it is possible that the system of the present invention could be run by a single financial institution it is envisaged that various financial institutions of a federal, national or international nature would have their own computers with value meters and float value records, the totality of the float value records representing the total value in circulation (in all purses), the funds represented thereby being apportioned between the participating institutions as agreed on the basis of their respective regulated float files.

BRIEF DESCRIPTION OF THE DRAWINGS

The invention will further be described with reference to the accompanying drawings, of which.

DETAILED DISCUSSION OF PREFERRED EMBODIMENTS

Figure 1:
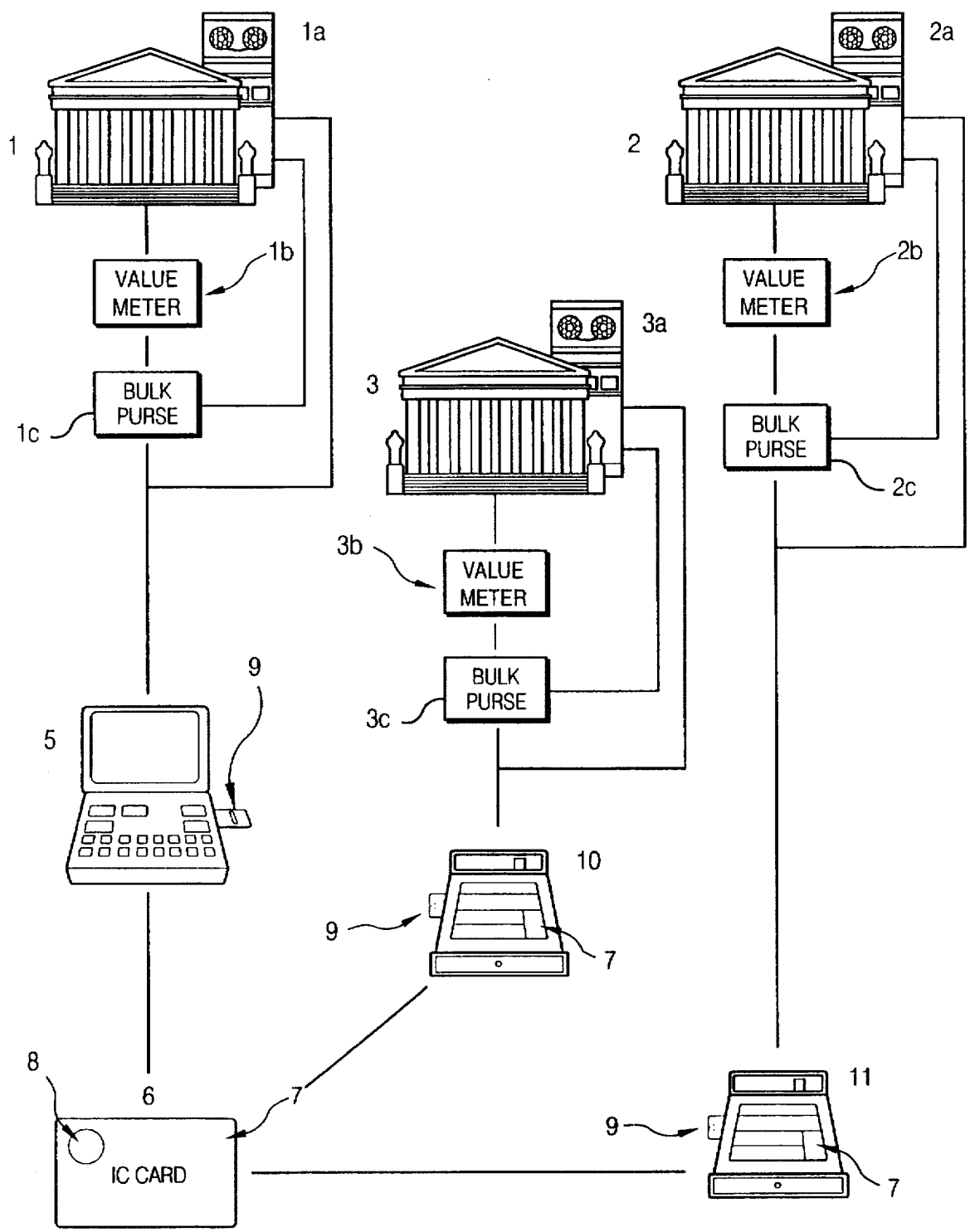
FIG. 1 is a schematic drawing of a banking computer system in accordance with the invention.

Referring to FIG. 1 there are shown three clearing banks 1, 2 and 3 with respective computers 1a, 2a and 3a. The computers have files containing account details of the banks' consumer and retailer customers. Each computer also has a value meter 1b, 2b, 3b which shows a float value record. The actual funds represented by the non-specific float value records may reside in one or more of banks 1, 2 or 3, or elsewhere.

Each bank has a bulk purse 1c, 2c, 3c which is connected to the respective value meter and which has a memory with a purse value record. Terminals 5 are connected by telephone selectively to computers 1, 2 and 3. Typically terminals 5 may be home computer terminals or terminals available in public places. Consumers have electronic purses in the form of IC cards 6. These cards have microprocessors and memories. In the memory of each card is stored a purse value record 7. The cards have contacts 8, whereby the cards can interact with terminals 5 via card readers 9. By making appropriate requests at the keyboard of the terminal, a consumer may be connected to the computer of his bank, 1, 2 or 3 and may request a value record to be loaded to his purse. If the bank authorises the request, the bulk purse is instructed to institute a draw-down of value to load purse value record 7 with the value requested. The card is now ready for use.

Further electronic purses are contained in terminals 10, 11 which are equipped with IC card readers 9, located at different points-of-sale. To use his card the consumer presents it to the retailer where it is inserted into reader 9. The required value of the transaction is keyed in and by agreement the total held in the purse value record of the purse 6 is reduced by the amount of the transaction. The purse value record of the purse held within the terminal 10 or 11 is increased by the same transaction value. The consumer takes his goods and is free to use the card up to the total held in the purse value record of his purse in other retailers' equipment.

Periodically a retailer may redeem value represented by the purse value record held in the purse of his terminal 10 or 11, irrespective of the consumers' identities and without presenting any details of the individual transactions that have given rise to the total accumulated value. This may be done by connecting the terminal 10 or 11 to the retailer's bank 1, 2 or 3 as appropriate and requesting a redemption of value. The bank's computer then instructs a redemption transaction which accepts value from the terminal purse. The bank computer credits the retailer's account with funds. The value meters form the basis for allowing control of the total amount of value in circulation in all the purses and for apportioning, on an agreed basis, funds representing the total value.

Figure 2:
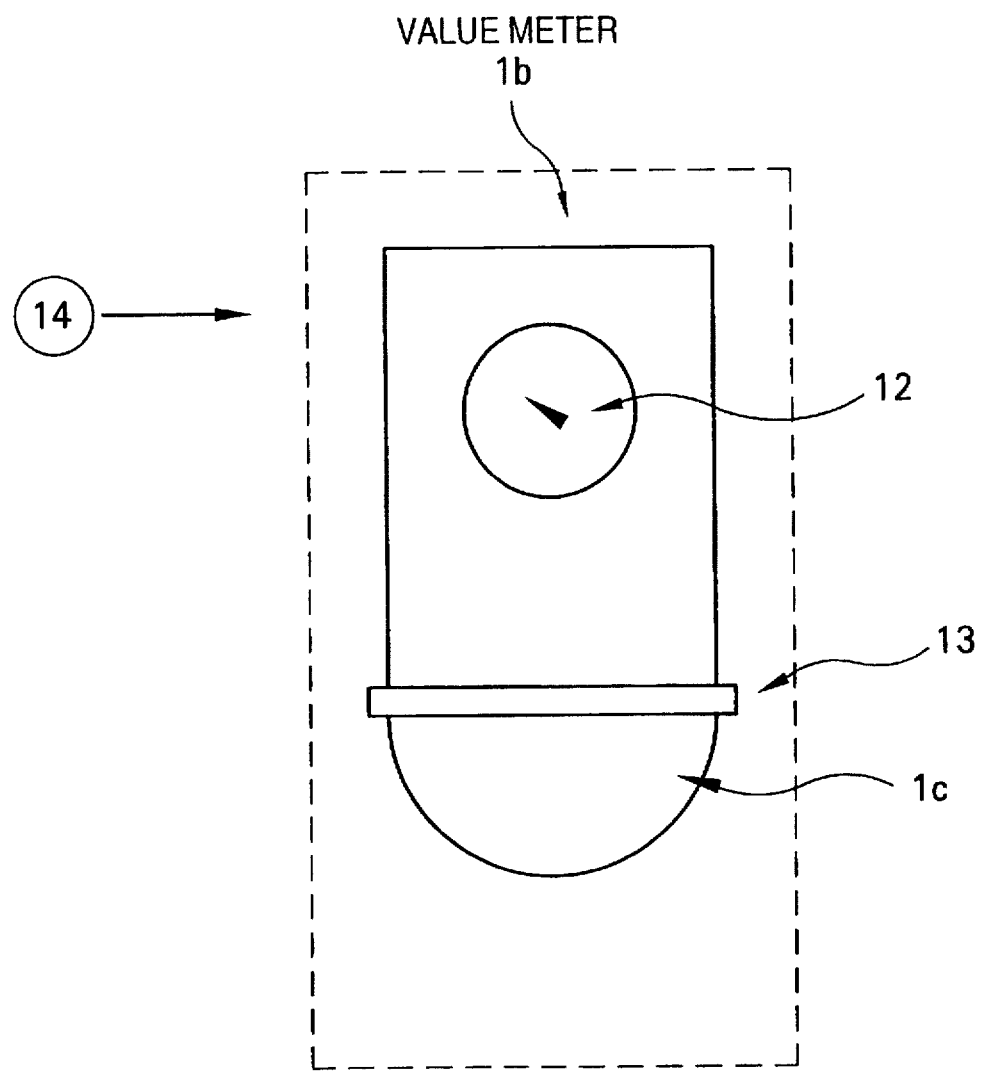
FIG. 2 is a diagram illustrating the value meter.

The bulk purses 1c, 2c, 3c differ from the other purses in being capable of having value loaded and redeemed via the value meter, as well as by purse to purse transactions. In all other respects the purses are technically similar, it being understood in particular that the same cryptographic techniques for bulk purse to other purse transactions (on-line) used are the same as for off-line transactions. FIG. 2 shows the value meter as including an indicator 12 which shows a float value record. This is, in this case, the net value released to the bulk purse 1c, being the difference between the total of values drawn down via the meter and the total of values redeemed via the meter. It will be appreciated that the individual gross draw-down and redeemed values may be indicated as well as or instead of the net value, it being readily possible to derive the net value from the gross values, even if not directly indicated. The link 13 between the value meter and that of each of its bulk purses is secure. The purse may be physically adjacent to the value meter and security ensured by physical locks etc. Alternatively, the bulk purse may be remote from the value meter and security is achieved by cryptographic techniques. It is important to ensure that the value meter always accurately represents the value released to the bulk purse and no fraudulent alteration can take place. Each value meter has an interface 14 which may be a link to the bank computing facility or a keyboard unit. Authorised personnel may enter values to be added to or subtracted from the float value record, representing a creation or destruction of value to be circulated. Thus, value to be circulated may be adjusted in bulk, perhaps daily, instead of on demand in response to individual draw-downs and claims.

Using the float value record in this way allows off-line interchange of value, given suitable terminals, between consumers and retailers, retailers and consumers and consumers and consumers, without the need to maintain large numbers of accounts or detailed account to account reconciliations.

Consumers themselves may adjust the purse value records in their purses by person to person interchange or by refunds etc from retailers. It is envisaged that purse value records may be transferred to individual accounts by a claiming procedure from the float value record in a similar manner as retailers' claims.

Purses may be used on an international basis by loading different currencies in them. It is envisaged that each country or group of countries will hold a float value record in the appropriate currency. Application by a consumer to load his purse with a foreign currency may result in his domestic account being debited by the appropriate amount in his own currency and the respective foreign currency float value record being increased.

A purse value record held in a purse may be converted to a different currency on request, the conversion being effected at the appropriate rate and resulting in a transfer of value from the float value record of one currency to that of another currency and a corresponding conversion of funds between the currencies.

Figure 3:
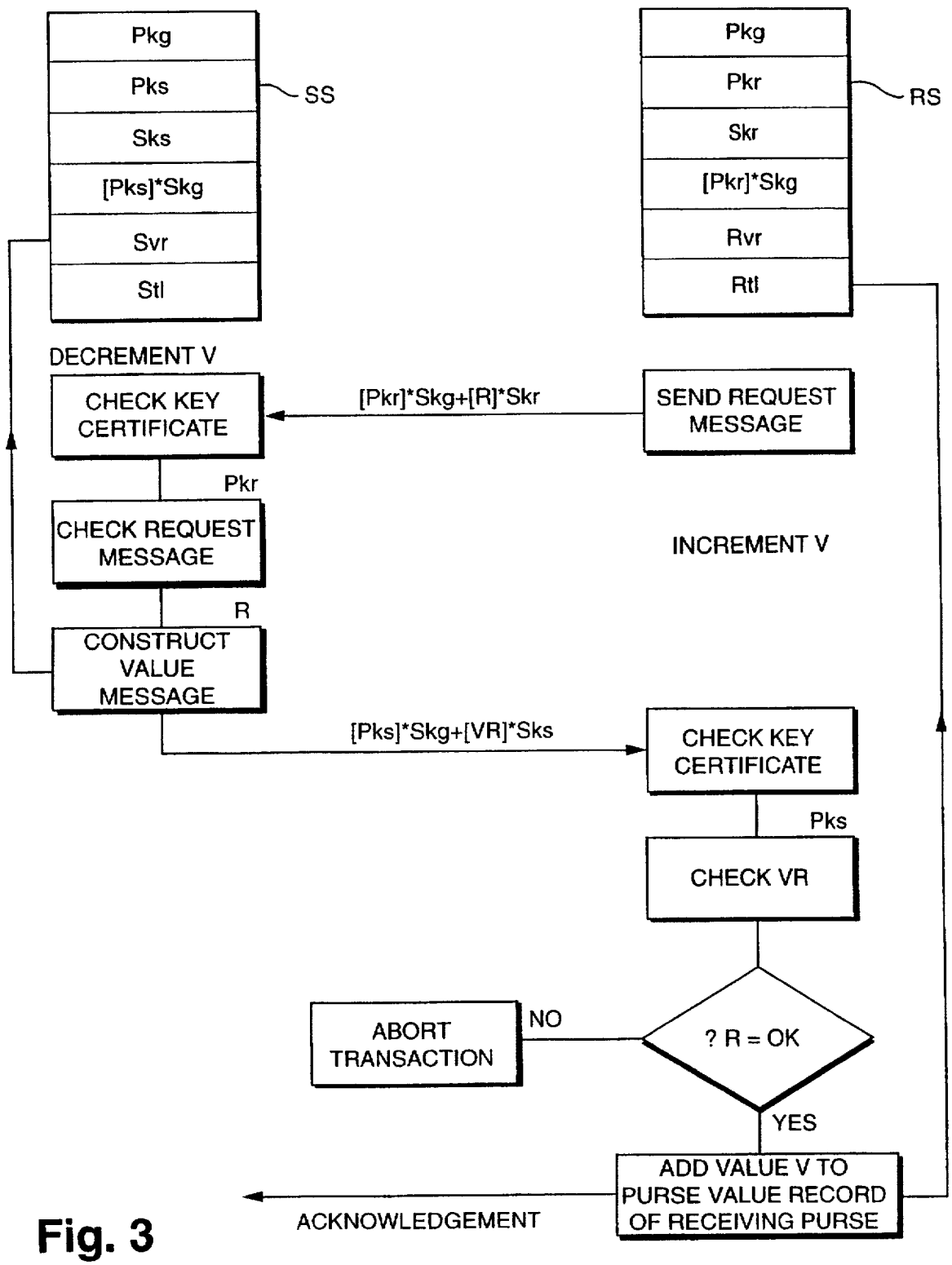
FIG. 3 is a diagram illustrating an example of a value transaction procedure using a full RSA cryptographic system.

FIG. 3 shows the procedure during an off-line transaction in a first embodiment of the invention. Both purses have full RSA asymmetrical cryptographic capability. The sending purse has a store SS which holds an accumulative value record Svr and the following RSA keys: sender public and secret keys Pks and Sks and global public key Pkg. In addition there is a certified data message [Pks]*Skg. This is the sender purse's unique public key signed by the master computer with its global secret key Skg. The public key Pks is thus electronically certified as valid by the system. The receiver purse has a store RS which holds an accumulative value record Rvr and the receiver purse's own RSA public and secret keys Pkr,Skr, the global public key Pkg and a certified public key data message [Pkr]*Skg.

The first step of the transaction procedure is for the receiving purse to issue a transaction identifier number R. This is derived from a combination of, the receiving purse identity and a transaction sequence number for that purse. Two-way communication between the purses is established, perhaps locally by direct connection or by infra-red link or the like or remotely by modem and telephone.

The following steps are followed:

1. The receiving purse transmits a request message which is [Pkr]*Skg+[R]*Skr.
2. The sending purse is able to check [Pkr]*Skg by use of the public global key Pkg. This gives the sending purse the authentic key Pkr to verify [R]*Skr and hence recover R.
3. A value V which is required to be transferred is decremented from the purse value record Svr.
4. The sending purse constructs a transaction value message VR from value V it wishes to transfer and from the request message R. This is signed with the sender's secret key and the following transaction value message is transmitted to the receiving purse:
[Pks]*Skg+[VR]*Sks
5. The receiving purse obtains the public key Pks by use of the public key Pkg thereby verifying the message [Pks]*Skg.
6. Use of the public key Pks thus found verifies [VR]*Sks and hence recovers VR.
7. R is checked to ensure that it carries the identity of the receiving purse and the appropriate transaction number. If not, the transaction is aborted.
8. If all is well, the value V is added to the purse value record of the receiving purse.
9. A signed acknowledgement is sent to the sending purse.

Transaction logs Stl and Rtl are held by the sending and receiving purse stores. The logs may carry such details as are required for analysis of transactions locally, but in the simplest form the logs carry records only of any transaction which has failed for some reason. This can be used for checking in the event of a dispute.

Figure 4:
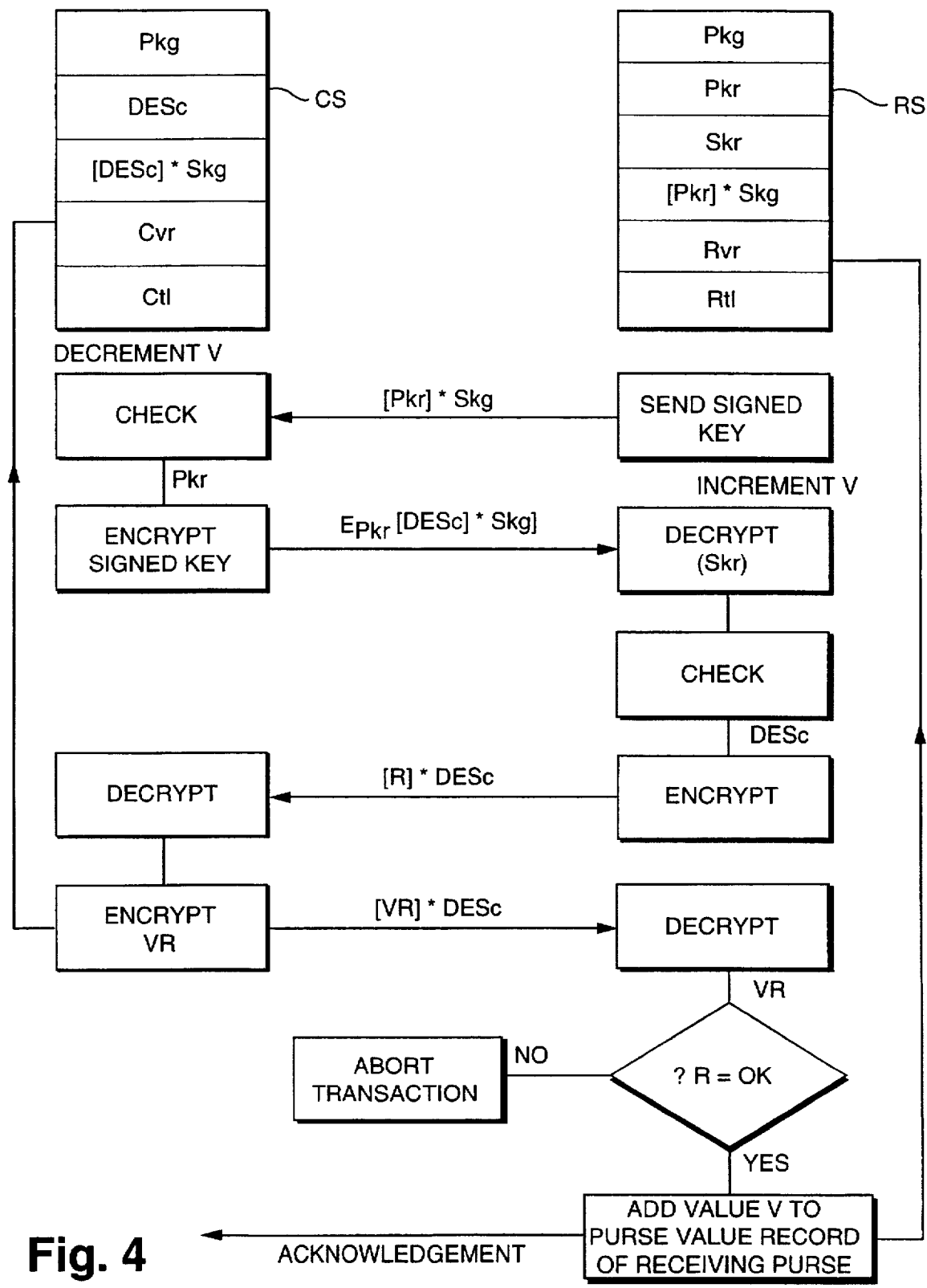
FIG. 4 is a diagram illustrating an example of a value transaction procedure using a secret key transmission technique.
Figure 5:
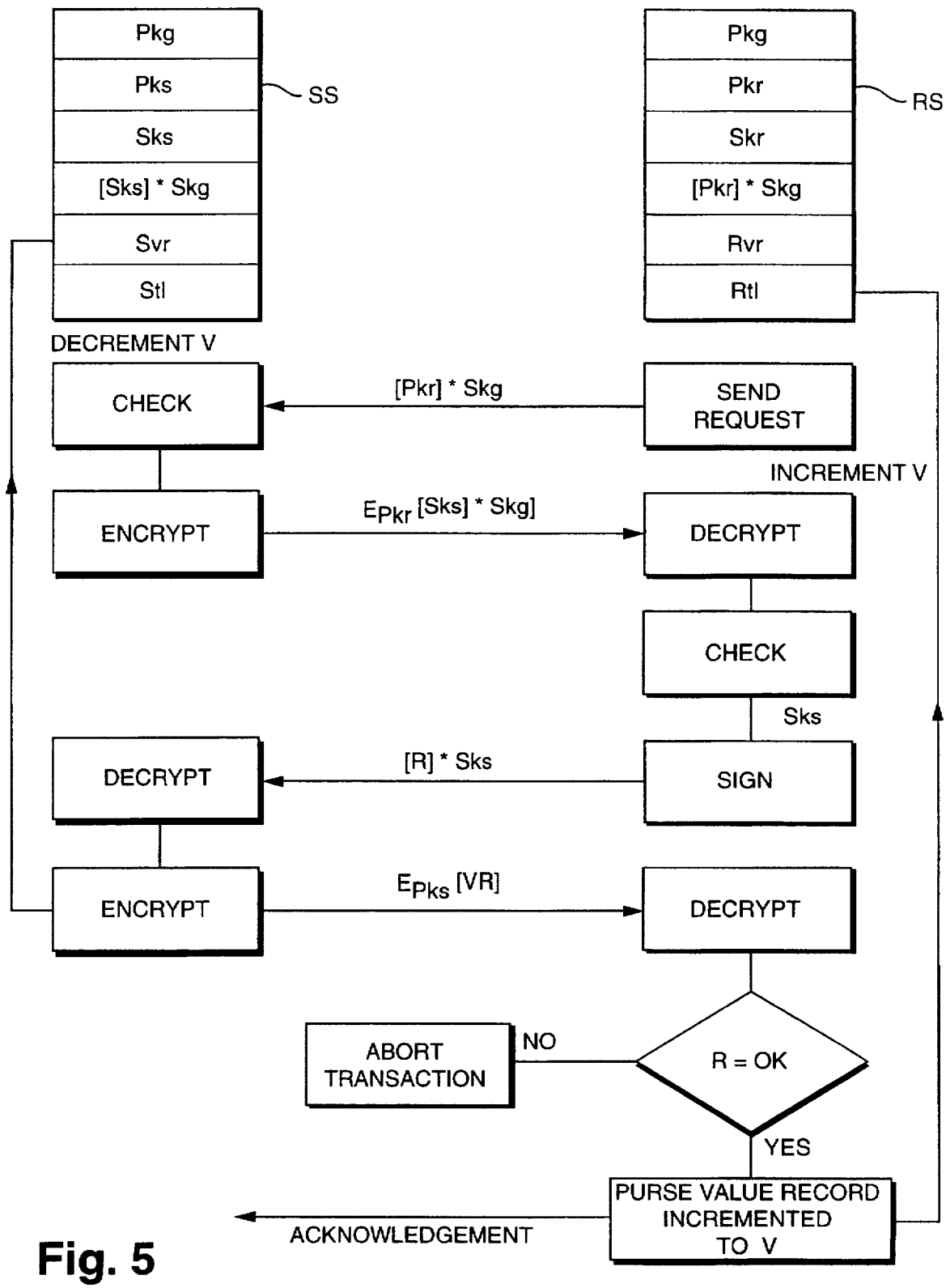
FIG. 5 is a diagram illustrating an example of a value transaction procedure using a mixed RSA/DES cryptographic system.

RSA encryption and decryption require calculation of the expression $x^y \mod n$ where y is different for encryption and decryption. In particular the index y for encryption (embodied in the public key) is small and the corresponding index for decryption (embodied in the secret key) is very much larger. As a consequence, while modest computing power can handle encryption in an acceptably short time the same is not true for decryption. The creation of a certified (eg digitally signed) message has an equivalent processing overhead to decryption, the checking of such a message has an equivalent processing overhead to encryption. The embodiments illustrated in FIGS. 4 and 5 provide arrangements which allow one of the pair of communicating purses to be of lower computing power, and therefore less expensive, than the other. In these arrangements some purses of the system (retailer purses) have full RSA capability (encryption and decryption capability) whereas the remainder (consumer purses) include a symmetrical key cryptographic system for transmitting transaction value record messages. A suitable symmetrical key cryptographic system is the DES system. This requires for encryption and decryption a level of computing power similar to the power required for RSA encryption.

Referring to FIG. 4 there is illustrated the transaction procedure between two purses where the sending purse is a consumer purse and the receiving purse is a retailer purse. The retailer purse has full RSA capability whereas the consumer purse has a lower power computing facility. The sending purse has a store CS which holds an accumulative value record Cvr and the RSA global public key Pkg. In addition there is a DES key DESc and a certified data message [DESc]*Skg which is the sending purse's unique DES key signed by the master computer with its global secret key Skg. The receiving purse has a store RS which is identical with the store RS of the FIG. 3 embodiment, holding Pkr,Skr,Pkg and [Pkr]*Skg.

The first step in the transaction procedure is for, the receiving purse to issue a transaction identifier R as in the embodiment of FIG. 3. Then the following steps are taken:

1. The receiving purse transmits its certified public key message [Pkr]*Skg.
2. The sending purse checks the signed message and derives Pkr.
3. The sending purse encrypts its certified message using Pkr. Since the index y of a public key such as Pkr is small, encryption with it is computationally easy. The message sent to the receiving purse is
$E_{pkr}$ [[DESc]*Skg]
4. The receiving purse decrypts the message firstly with its secret key Skr to derive [DESc]*Skg which itself is checked with Pkg to give verification and derive DESc.
5. The receiving purse transmits the message [R]*DESc which is the transaction identifier R encrypted with a DES integrity algorithm.
6. The sending purse decrypts the message in DES, derives the transaction identifier R and constructs the transaction value message VR in the same way as in the FIG. 3 embodiment.
7. The sending purse decrements the value V from its purse value record and sends the message [VR]*DESc to the receiving purse.
8. The receiving purse decrypts [VR]*DES and cheeks that R is correct. If not the transaction is aborted.
9. If all is well the value V is added to the receiving purse's purse value record and an acknowledgement message is sent to the sending purse.

Referring now to FIG. 5 there is shown a transaction procedure which allows the purses to have unbalanced computing power while using the keys of an asymmetrical cryptographic system. In FIG. 5 the store RS of the receiving purse has the same keys as in the FIG. 3 embodiment. The computing power of the sending purse is less than that of the receiving purse and instead of the signed public key, the sending purse holds a signed secret key [Sks]*Skg (which also incorporates Pks). A transaction procedure has the following steps:

1. The receiving purse transmits the signed message [Pkr]*Skg.
2. The sending purse checks the signed message with Pkg, verifying [Pkr]*Skg and hence recovering Pkr.
3. The sending purse encrypts its signed message with Pkr and sends $E_{Pkr}$ [[Sks]*Skg].
4. The receiving purse decrypts the message firstly with the use of its secret key Skr to give [Sks]*Skg and then uses the global public key Pkg to verify [Sks]*Skg, thereby recovering Sks.
5. The receiving purse signs the transaction identifier R with Sks and sends [R]*Sks.
6. The sending purse derives R by the use of Pks.
7. The sending purse decrements its purse value record by the required amount V, and constructs and sends a value message $E_{Pks}$ [VR].
8. The receiving purse decrypts the message with the use of Sks to derive V and R. R is checked and if it is incorrect the transaction is aborted.
9. If all it well the purse value record of the receiving purse is incremented by V, the key Sks in the receiving purse is discarded and an acknowledgement message is sent to the sending purse.

Figure 6:
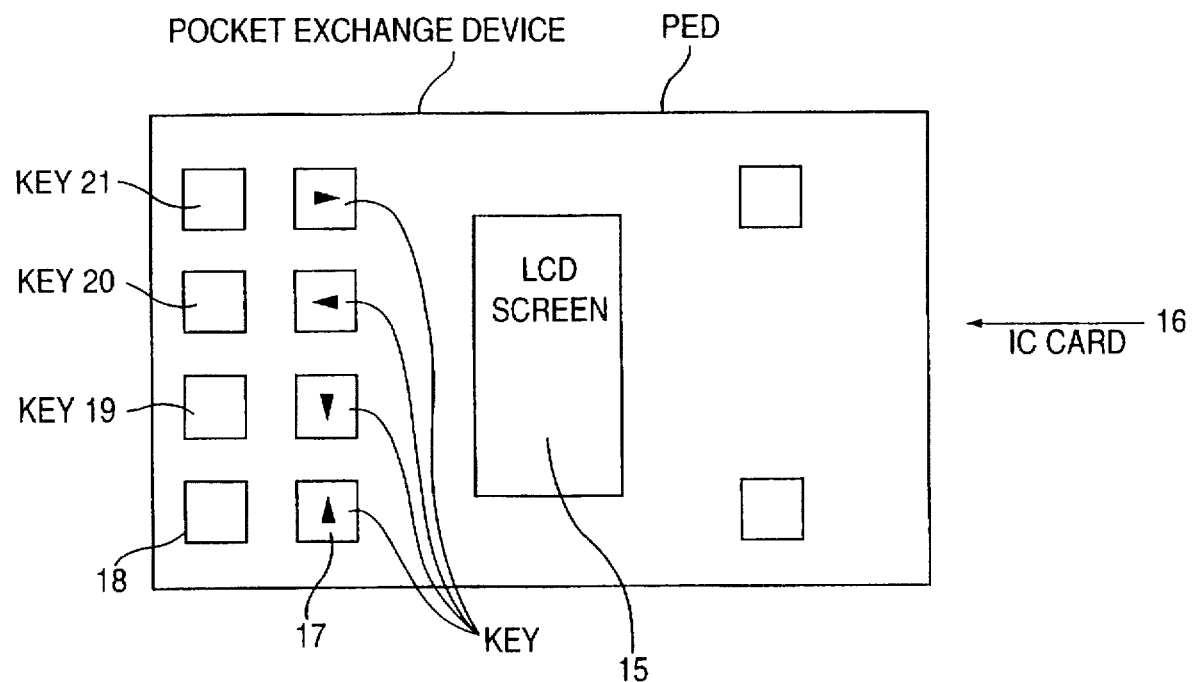
FIGS. 6 and 7 depict one possible embodiment of typical devices of the invention.

FIG. 6 shows one embodiment of the invention in the form the pocket exchange device referred to above. This device PED is battery powered or solar powered and has an LCD screen 15 and IC card reader 16. The consumer's card is inserted in reader 16 and it may then be interrogated by means of keys 17 to 21. Keys 17 allow the user to scroll through log entries and balances resident on the card, accessed via keys 19 and 20. Keys 18 and 21 allow interchange between two cards, via an intermediate store within the device.

Figure 7:
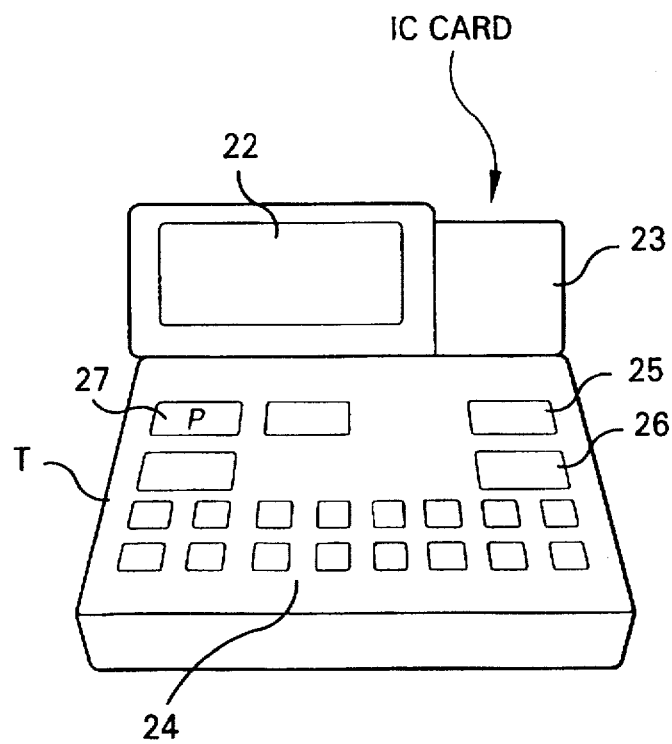

FIG. 7 depicts a device such as may be found at a retailer's point-of-sale. Similar terminals without retailer functions may be located in financial institutions or in other public places for the use of consumers in accessing their bank account for the purpose of loading and unloading their cards. The device T consists of a point-of-sale terminal, bearing an LCD (or other) display 22, and an IC card reader 23. By means of keyboard 24 the total of a retail transaction may be entered into the terminal. Keys 25 and 26 initiate the transaction with the IC card, inserted in reader 23. After hours, the retailer can prepare the terminal for transmission of value to the bank's host by depressing key 27.

We claim:

1. A value transfer system, said system comprising:

a computer system;

a plurality of electronic purses;

at least one exchange device whereby said purses communicate with each other to transfer value in transactions which are off-line from the computer system; and a cryptographic key system under which communication between purses is effected, each purse storing one or more cryptographic keys and including a microprocessor, wherein, in a transaction between a first purse having a microprocessor of a first computing power and a second purse having a microprocessor of a second computing power, said first power being superior to said second power, the microprocessors are programmed to send to the first purse a secret key of the second purse.

2. A value transfer system as claimed in claim 1 in which the first purse stores its own unique public/secret key pair in the cryptographic system, and wherein said step of sending to the first purse a secret key of the second purse is preceded by the step of sending to the second purse the public key of the first purse, and wherein the secret key of the second purse is encrypted using the public key of the first purse prior to being sent to the first purse.

3. A value transfer system as claimed in claim 2 wherein the transaction includes the subsequent steps of encrypting, in said first purse, a transaction message using the secret key of said second purse and sending the encrypted message to the second purse.

4. A value transfer system as claimed in claim 3 in which the second purse stores its own unique public/secret key pair in the cryptographic system, said transaction including the step of decrypting, in said second purse, the transaction message using the public key of the second purse.

5. A value transfer system as claimed in claim 3 in which the secret key of the second purse takes the form of an encryption key for a symmetrical cryptographic system, said transaction including the step of decrypting in said second purse, the transaction message using the encryption key.

6. A value transfer system as claimed in claim 1 wherein the transaction includes the subsequent steps of encrypting, in said first purse, a transaction message using the secret key of said second purse and sending the encrypted message to the second purse.

7. A value transfer system as claimed in claim 6 in which the second purse stores its own unique public/secret key pair in the cryptographic system, said transaction including the step of decrypting, in said second purse, the transaction message using the public key of the second purse.

8. A value transfer system as claimed in claim 6 in which the secret key of the second purse takes the form of an encryption key for a symmetrical cryptographic system, said transaction including the step of decrypting in said second purse, the transaction message using the encryption key.

* * * * *